No. 12,653. REISSUED MAY 21, 1907.

W. FETZER.

TRUCK MECHANISM.

APPLICATION FILED FEB. 27, 1907.

Witnesses:

Jas. E. Hutchinson.

Thos. R. Heath.

Inventor.

William Fetzer,

By Macomber & Milans Attorneys

UNITED STATES PATENT OFFICE.

WILLIAM FETZER, OF MIDDLETOWN, OHIO.

TRUCK MECHANISM.

No. 12,653. Specification of Reissued Letters Patent. Reissued May 21, 1907.

Original No. 723,662, dated March 24, 1903. Application for reissue filed February 27, 1907. Serial No. 359,703.

*To all whom it may concern:*

Be it known that I, WILLIAM FETZER, a citizen of the United States, residing at Middletown, in the county of Butler and State of Ohio, have invented certain new and useful Improvements in Truck Mechanism; and I do hereby declare the following to be a full, clear, and exact description of the invention, such as will enable others skilled in the art to which it appertains to make and use the same.

The invention relates to truck mechanism designed more especially to be connected to the forward frame part of farm tilling machines.

While the invention is not limited in its useful application, it can be used to great advantage with what is known as "low down press drills."

The special object of the invention is to provide a truck mechanism for tilling machines which will not be likely to creel or tip out of proper position when the machine is to be turned in either direction.

The invention comprises a truck mechanism for tilling machines provided with downwardly extending means leading from the frame of the machine to a guiding truck, said means projecting to a point near the axle of the truck wheel and means for connecting the parts to said axle which is capable of a wide range of variable movements, so as to properly meet the requirements and to prevent creeling or improper tipping.

The invention also comprehends certain new and novel structural features in combination and arrangements as will hereinafter be more fully described and claimed.

I have shown the improvements in the accompanying drawings as applied to a drill part, the major portion of the drill not being shown as that is not the essence of the invention.

Figure 1:
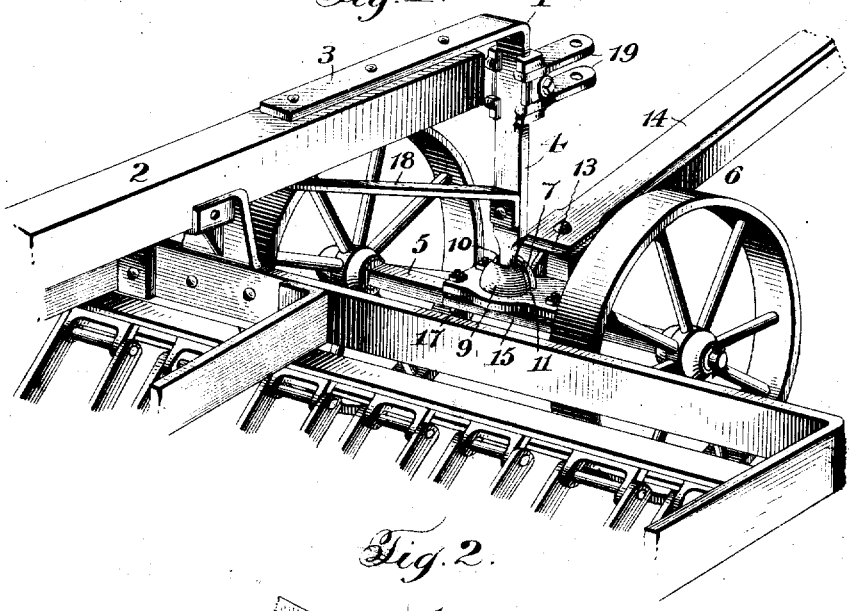
Figure 2:
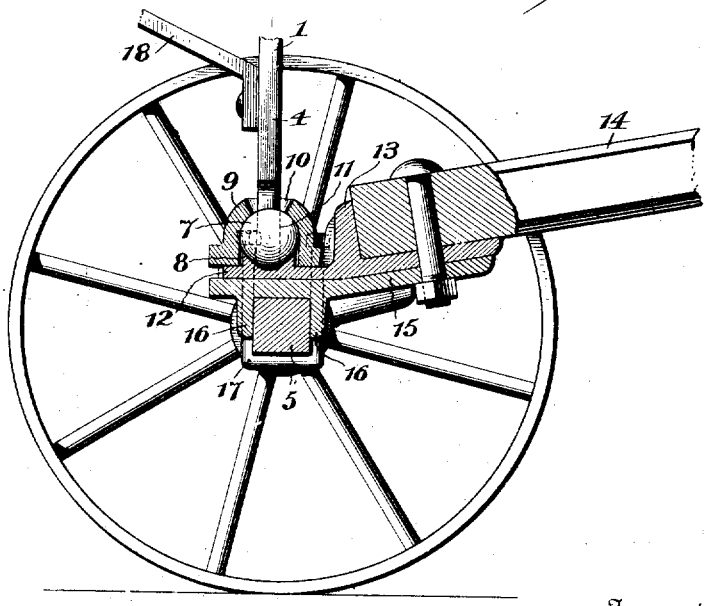

In the accompanying drawings, Figure 1 is a perspective view of the truck connection for a drill forming the subject matter of this invention, the drill being not shown. Fig. 2 is a detail sectional view through the truck connection.

The present invention is designed to supply a truck mechanism for a drill, and more especially a low down press-drill in which the articulating joint between the frame of the drill and the front truck is brought to a point practically at the axis of said truck, while at the same time draft mechanism for drawing the drill can be applied to the connecting means interposed between the frame and the forward truck at different points between said frame and truck.

In embodying the features of the invention in practical form I secure an iron 1 to the front of the frame, preferably at the end of the stub-tongue 2 of a low-down press-drill. This iron is preferably L-shaped, as shown in Fig. 1, and is formed with a rearwardly-extending attaching portion 3, which may be riveted, bolted, or otherwise secured to the frame or stub-tongue 2. The forward portion of the said iron 1 is in the form of a vertical leg 4, which extends downwardly to a point just above the axle 5 of a front guiding-truck 6. The lower end of this vertical leg 4 preferably carries a ball or spherical enlarged portion 7, which is inclosed in a socket 8 of suitable structure carried by the front axle. This structure preferably consists of a socket-plate 9, formed with a radiated opening 10 of sufficient size to confine the ball 7 in the socket, but to permit the leg 4 to have considerable forward, backward, or lateral movement, as may be required. The opening 10 is also preferably formed with lateral openings 11 upon opposite sides, so that the socket-plate 9 may be slid upon the flat L-iron until the ball 7 is brought into proper position. The ball 7 preferably rests upon a seat-plate 12, which has a seat or bearing formed thereon for receiving the ball 7, while a portion of said plate extends forwardly and is formed with a boxing or recess, as at 13, for receiving the rear end of the tongue 14 of the front truck 6. The seat-plate 12 and the socket-plate 9 are carried by an axle-plate 15, formed with downwardly extending flanges 16, which embrace the axle of the front truck, the said axle being held between said projections by means of U-shaped bolts or clips 17. The upper ends of these U-shaped bolts project upwardly through apertures in the axle-plate and in the socket plate, all the parts being held together by applying nuts to the upper threaded ends of the said clips or U-shaped irons 17. The axle plate 15 and the seat plate 12 are secured together and to the end of the tongue 14 by bolts, rivets, or the like or in any other suitable manner. The vertical leg 4 of the iron 1 is braced with respect to the frame or the stub-tongue 2 by a brace-rod 18, extending from said leg 4 at a point near its lower end obliquely back to the frame of the tongue 2. The brace 18 may be riveted or bolted to the leg 4 or may be formed integral therewith, if desired.

As shown in Fig. 1 of the drawings, there is a considerable space left upon the leg 4 above the brace rod or member 18, so that the clevis 19 may be secured to the said leg in any suitable manner for the attachment of the draft means (not shown) to the drill. It will be seen that the clevis 19 can be clamped or otherwise secured to the leg 4 at varying heights upon said leg as may be desired.

In practice, the use of the construction is found to prevent the creeling or tipping of the front truck when the drill is drawn to one side or the other, as in turning it about. The tendency heretofore in trucks where the pivotal connection of the truck with the tongue 14 of the drill was located above or in line with the stub tongue, was to cause the front truck to creel, often lifting one of the wheels above the ground or otherwise twisting it out of position. By the present invention, this tendency is obviated, since the weight of the front of the drill is transferred to a point between the wheels of the front truck and conveniently near the axis of said wheels, and at the same time means is afforded for the attachment of the draft mechanism for the drill at adjustable points with relation to the front truck and with relation to the frame or stub-tongue of the drill.

Having thus fully described my invention, what I claim as new, and desire to secure by Letters Patent, is:

1. In an agricultural machine, the combination with tillage instrumentalities, of a forwardly extending stub tongue, means extending downwardly from said tongue, a two-wheeled truck located below said forwardly extending tongue carrying a bearing for said downwardly extending means, said bearing being located approximately at the axis of the wheels of the truck and means for securing the parts together to permit free movement in any direction.

2. In an agricultural machine, the combination with tillage instrumentalities, of a stub tongue projecting forwardly therefrom, a downwardly extending rigid member on the said stub tongue, a two-wheeled truck located below said stub tongue, a universal connection between the said downwardly extending member and the said truck, rearwardly of the tongue, a tongue secured to said truck and draft attaching means secured to the machine independent of the tongue and truck.

3. A truck connection for low-down press-drills comprising an L-iron secured to the frame of said drill and extending downwardly therefrom to the center of a front truck, a front truck for receiving and supporting said iron, and a ball-joint interposed between the end of the iron and the axle of said truck, substantially as described.

4. A truck connection for drills comprising an L-iron having a horizontal leg with an attaching portion formed thereon adapted to be secured to the frame of the drill, a vertical leg extending downwardly from said horizontal leg and carrying a ball at its lower end, a truck for supporting said ball, and a socket-plate carried by the axle of said truck for receiving the said ball, substantially as described.

5. A truck for press-drills comprising an L-iron secured to the frame of a drill, said L-iron having a forward vertical leg extending downwardly from the said frame, means for bracing the said vertical leg with respect to the frame, a truck supporting the vertical leg, and a universal joint interposed between the said iron and front truck, substantially as described.

6. A truck connection for drills comprising an approximately triangular-shaped iron having a ball at its lower end, a truck for supporting said iron, a socket-plate carried on the axle of said truck, means for holding the said ball in said socket, and a clevis mounted upon the said iron for securing draft means to the iron at different heigths thereon, substantially as described.

7. A truck connection for drills comprising an L-iron secured to the frame of the drill and having a downwardly-extending vertical leg, a front truck for supporting the same, and a clevis adapted to be clamped at different heights upon the said vertical leg for attaching a draft mechanism thereto, substantially as described.

8. A truck connection for drills comprising an L-iron secured to the frame of the drill and having one leg extending downwardly to the center of a front truck, a socket upon said front truck for receiving the lower end of said iron, said socket being formed of a socket-plate and a seat-plate, an axle-plate carrying said seat-plate and socket-plate, means for securing said plates together and to the axle of the front truck, and means for securing the tongue of the front truck to said seat-plate and axle-plate, substantially as described.

9. In an agricultural machine, the combination with tillage instrumentalities, of a stub tongue projecting forwardly from the machine, a downwardly extending member on the said stub tongue, a two-wheeled truck, a universal connection directly between the downwardly extending member and the two-wheeled truck, a tongue secured to the truck, and means for connecting the draft means to the machine at a point above the connection and independent of the truck and tongue.

10. In an agricultural machine, the combination with tillage instrumentalities, of a stub tongue part, a two-wheeled truck located below the same, means extending downwardly from the stub tongue to the axle of the truck, a universal connection between said truck axle and said downwardly extending means constructed to permit free movement in all directions, a tongue secured to the truck adjacent to the said connection and in advance thereof and a draft attaching means secured to the machine above and independent of the tongue and truck.

11. In an agricultural machine, the combination with tillage instrumentalities, of means attached to the front part of the machine and projecting downwardly therefrom, a front truck mechanism, a universal connection between the said front truck mechanism and the said downwardly extending means located near the axis of the truck wheels, means for holding the parts together, a tongue secured to the truck member and a draft applying means secured to the machine above the said truck.

12. In an agricultural machine, the combination with tillage instrumentalities, of a stub tongue part, a two-wheeled truck located below the same, a universal connection between the truck and the stub tongue located centrally between and near the axis of the wheels of the truck, a tongue secured to the truck in advance of said connection, and a draft applying means secured to the machine independent of the tongue and truck.

13. In an agricultural machine, the combination with tillage instrumentalities, of a two-wheeled truck, a supporting seat on the axle and adjacent the axis of the wheels of the truck, in combination with a stub tongue having a member extending downwardly therefrom, said member carrying a part resting in said seat, means for coupling the parts together to permit free movement in all directions, a tongue secured to the truck, and a draft applying connecting means secured to the stub tongue.

14. In an agricultural machine, the combination with tillage instrumentalities, of a truck connection therefor, comprising a two-wheeled truck having a connecting axle, a tongue secured to the truck, in combination with a stub tongue, a downwardly extending rigid member on the stub tongue and a coupling between the downwardly extending member and the truck axle in the rear of the tongue, said coupling being constructed to permit tilting and pivotal movement of the truck and being located substantially on the plane of the horizontal axis of the wheels of the truck.

15. In an agricultural machine, the combination with tillage instrumentalities, of a two-wheeled truck, a tongue connected thereto, in combination with a stub tongue on the machine, a rigid dependng member secured to the stub tongue, a universal coupling between the axle of the truck and the depending member located centrally between the wheels of the truck and substantially on the plane of the axis of the wheels whereby the truck may be moved in all directions independent of the stub tongue.

16. In an agricultural machine, the combination with tillage instrumentalities, of a stub tongue extending forward from the machine, a rigid downwardly extending member on the stub tongue, a two-wheeled truck below the stub tongue, a pivoted connection between the said downwardly extending member and the axle of the truck located adjacent the horizontal axis of the wheels of the truck, means for positively securing the parts together, and a tongue connected to the truck.

17. In an agricultural machine, the combination with tillage instrumentalities, of a two-wheeled truck located below the forward end thereof, means extending downwardly from said forward end, a pivotal connection between said downwardly extending means and the axle of the truck, located at a point adjacent the horizontal axis of the wheels of the truck, draft applying means connected to said downwardly extending means, and a tongue connected to said truck, substantially as described.

In testimony whereof I affix my signature in the presence of two witnesses this 21st day of February, 1907.

WILLIAM FETZER.

Witnesses:
R. C. ZECHER,
CHRIST MOEHRING.